(12) United States Patent
Fujita et al.

(10) Patent No.: US 7,847,463 B2
(45) Date of Patent: Dec. 7, 2010

(54) ALTERNATING-CURRENT DYNAMOELECTRIC MACHINE

(75) Inventors: Masahiko Fujita, Tokyo (JP); Haruyuki Kometani, Tokyo (JP); Toshiyuki Yoshizawa, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 49 days.

(21) Appl. No.: 12/143,555

(22) Filed: Jun. 20, 2008

(65) Prior Publication Data
US 2008/0252167 A1    Oct. 16, 2008

Related U.S. Application Data

(62) Division of application No. 11/003,781, filed on Dec. 6, 2004, now abandoned.

(30) Foreign Application Priority Data

Jan. 19, 2004    (JP)    ............... 2004-010909

(51) Int. Cl.
*H02K 21/12*    (2006.01)
(52) U.S. Cl. .................................. 310/156.66
(58) Field of Classification Search ................. 310/156.66–156.73, 263
See application file for complete search history.

(56) References Cited

U.S. PATENT DOCUMENTS

| | | | |
|---|---|---|---|
| 5,548,171 A | 8/1996 | Ogawa et al. | |
| 6,002,194 A | 12/1999 | Asao | |
| 6,013,967 A | 1/2000 | Ragaly et al. | |
| 6,369,485 B1 | 4/2002 | Oohashi et al. | |
| 7,067,954 B2 | 6/2006 | Kuribayashi et al. | |
| 7,095,154 B2 * | 8/2006 | Fujita et al. .................. | 310/263 |

FOREIGN PATENT DOCUMENTS

| | | |
|---|---|---|
| DE | 199 39 808 A1 | 2/2001 |
| EP | 1 117 168 A | 7/2001 |
| EP | 1 227 566 A | 7/2002 |
| EP | 1 331 717 A | 7/2003 |
| FR | 2 786 625 A | 6/2000 |
| JP | 2548882 B2 | 8/1996 |
| JP | 09-308148 A | 11/1997 |
| JP | 11-136913 A | 5/1999 |
| JP | 11-275832 A | 10/1999 |
| JP | 11-356019 A | 12/1999 |
| JP | 2001-086715 A | 3/2001 |
| JP | 2003-219617 A | 7/2003 |

* cited by examiner

*Primary Examiner*—Nguyen N Hanh
(74) *Attorney, Agent, or Firm*—Sughrue Mion, PLLC

(57) ABSTRACT

A projected shape of permanent magnets is contained within a plane of projection formed by adjacent claw-shaped magnetic poles overlapping when the claw-shaped magnetic poles are viewed in a direction of rotation of a rotor, and is generally similar in shape to a shape of the plane of projection.

2 Claims, 14 Drawing Sheets

US 7,847,463 B2

ALTERNATING-CURRENT DYNAMOELECTRIC MACHINE

This is a divisional of application Ser. No. 11/003,781 filed Dec. 6, 2004 now abandoned. The entire disclosure of the prior application, application Ser. No. 11/003,781 is hereby incorporated by reference.

BACKGROUND OF THE INVENTION

1. Field of the Invention

The present invention relates to an alternating-current dynamoelectric machine having a rotor in which permanent magnets are disposed between adjacent claw-shaped magnetic poles.

2. Description of the Related Art

Conventionally, automotive alternators are known in which permanent magnets are disposed between adjacent claw-shaped magnetic poles to reduce magnetic flux leakage between the adjacent claw-shaped magnetic poles. (See Patent Literature 1, for example.)

Patent Literature 1 Japanese Patent No. 2548882 (Gazette: FIG. 3)

In such constructions, one problem is that when the claw-shaped magnetic poles are viewed in a direction of rotation of the rotor, the permanent magnets protrude from a plane of projection formed by adjacent claw-shaped magnetic poles overlapping, and since protruding portions do not contribute to reductions in magnetic flux leakage, excessive volume is required in the permanent magnets to improve their properties, increasing costs proportionately.

Another problem is that increasing the volume of the permanent magnets also proportionately increases centrifugal force acting on the rotor, making durability poor.

SUMMARY OF THE INVENTION

The present invention aims to solve the above problems and an object of the present invention is to provide an alternating-current dynamoelectric machine enabling costs to be reduced and durability to be improved by reducing the volume of permanent magnets, and in the case of a generator-motor, for example, generating a large starting torque and having a reduced de-energized no-load induced voltage.

In order to achieve the above object, according to one aspect of the present invention, there is provided an alternating-current dynamoelectric machine including: a stator including: a stator core in which slots extending in an axial direction are formed on an inner peripheral side; and a stator winding mounted to the stator core by winding conducting wires into the slots; and a rotatable rotor including: a field winding disposed inside the stator; a rotor core constituted by a first rotor core portion and a second rotor core portion each having claw-shaped magnetic poles disposed so as to cover the field winding and alternately intermesh with each other; and a plurality of permanent magnets disposed between adjacent claw-shaped magnetic poles and having magnetic fields oriented so as to reduce leakage of magnetic flux between the claw-shaped magnetic poles, wherein: a projected shape of the permanent magnets is contained within a plane of projection formed by the adjacent claw-shaped magnetic poles overlapping when the claw-shaped magnetic poles are viewed in a direction of rotation of the rotor, and is generally similar in shape to a shape of the plane of projection.

An alternating-current dynamoelectric machine according to the present invention enables costs to be reduced and durability to be improved by reducing the volume of permanent magnets, and in the case of a generator-motor, for example, generates a large starting torque and has a reduced de-energized no-load induced voltage.

DETAILED DESCRIPTION OF THE PREFERRED EMBODIMENTS

Figure 1:
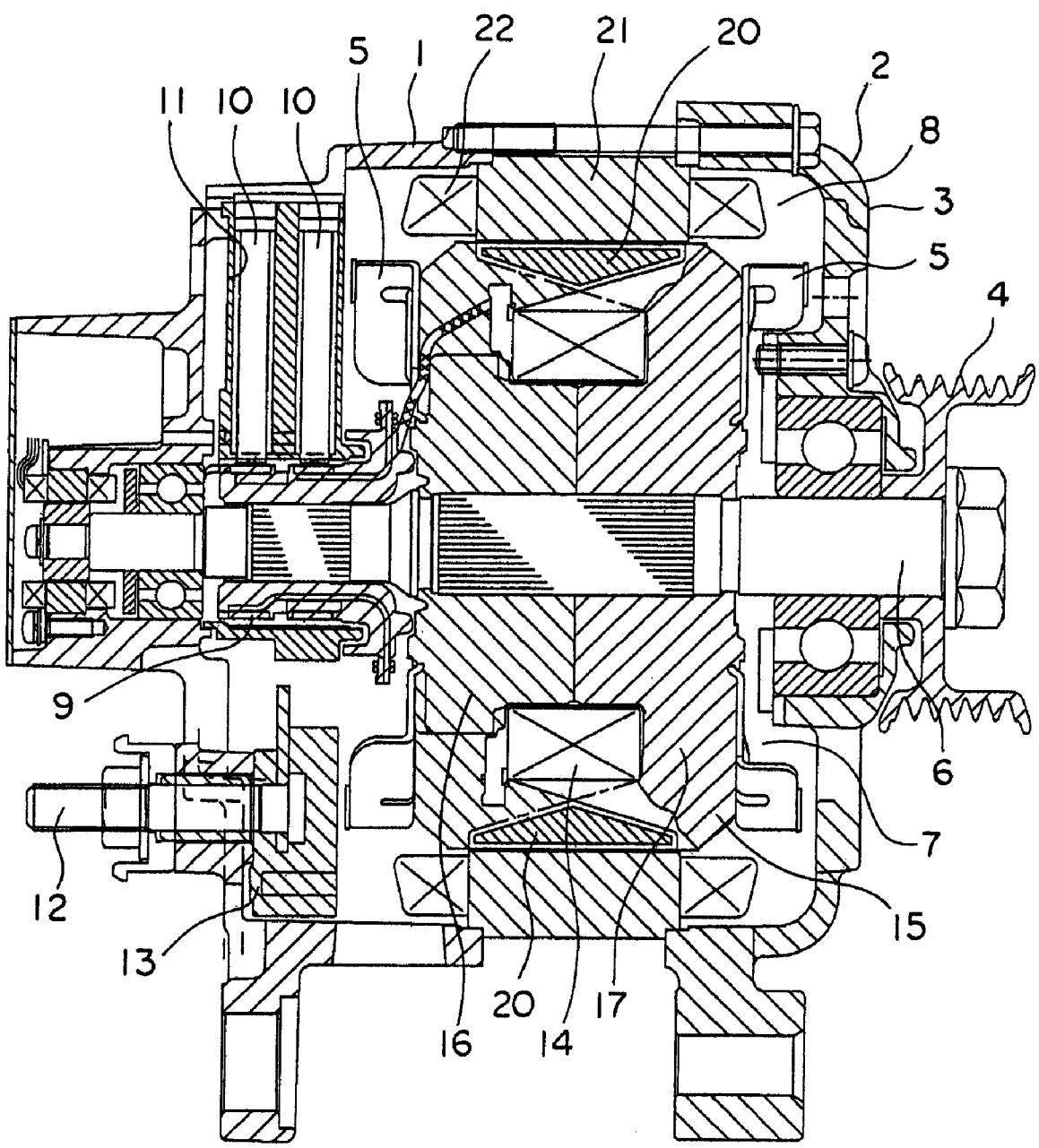
FIG. 1 is a cross section showing an automotive alternating-current generator-motor according to Embodiment 1 of the present invention.

Preferred embodiments of the present invention will now be explained based on drawings, and identical or corresponding members and portions in the drawings will be given identical numbering.

Moreover, in each of the embodiments, an automotive alternating-current generator-motor will be explained as an example of an alternating-current dynamoelectric machine.

Embodiment 1

Figure 2:
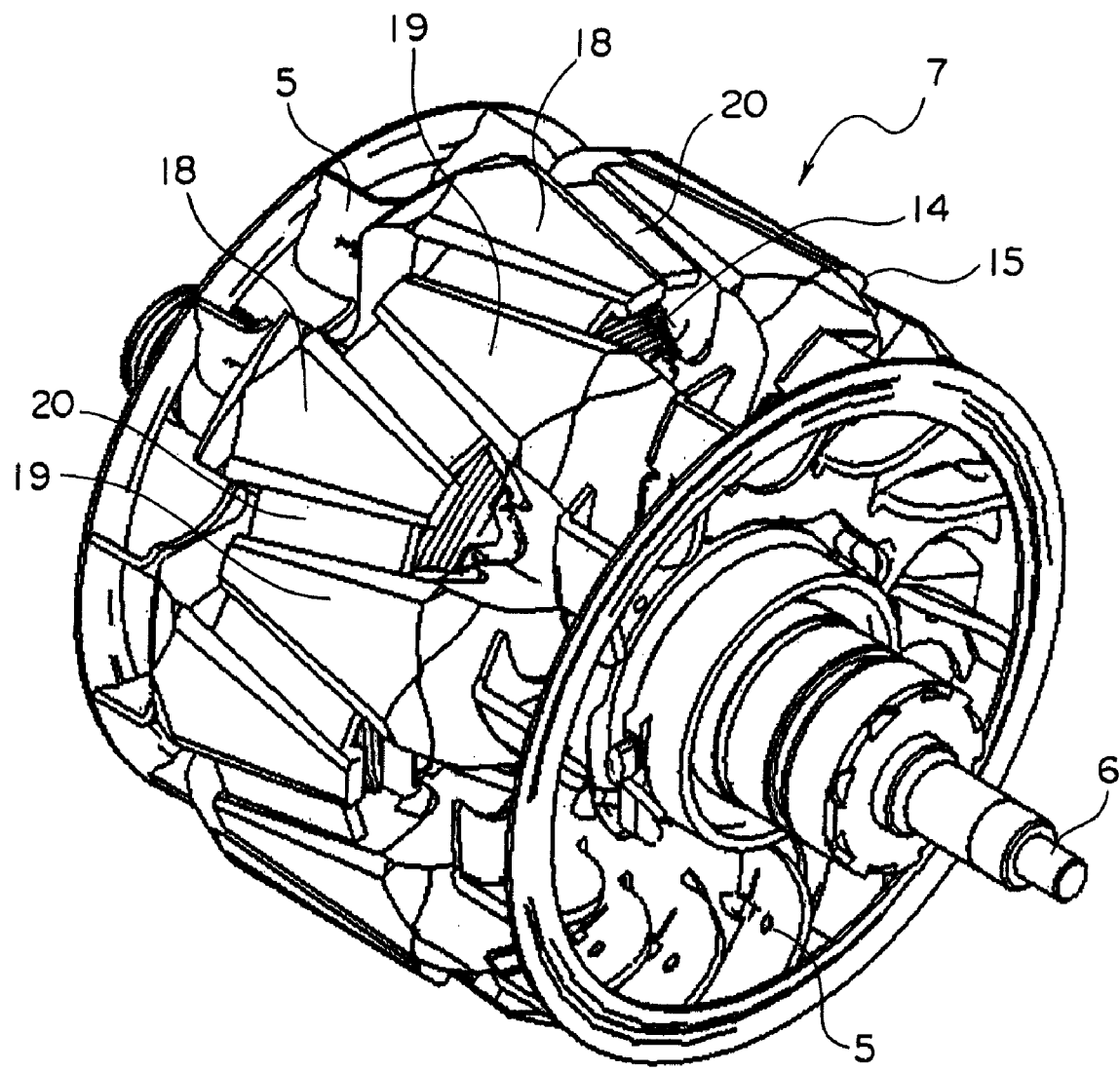
FIG. 2 is a perspective showing a rotor from FIG. 1.

FIG. 1 is a cross section showing an automotive alternating-current generator-motor according to Embodiment 1 of the present invention, and FIG. 2 is a perspective of a rotor from FIG. 1.

This automotive alternating-current generator-motor (hereinafter "generator-motor"), which constitutes a dynamoelectric machine, includes: a case 3 constituted by a front bracket 1 and a rear bracket 2 made of aluminum; a shaft 6 disposed inside the case 3, a pulley 4 being secured to a first end portion of the shaft 6; a Lundell-type rotor 7 secured to the shaft 6; fans 5 secured to two end surfaces of the rotor 7; a stator 8 secured to an inner wall surface of the case 3; slip rings 9 secured to a second end portion of the shaft 6 for supplying electric current to the rotor 7; a pair of brushes 10 sliding on the slip rings 9; a brush holder 11 housing the brushes 10; a terminal block 12 disposed on the front bracket 1 for connecting to an inverter circuit (not shown); and a circuit board 13 connected to the terminal block 12.

The rotor 7 includes: a field winding 14 for generating a magnetic flux on passage of an electric current; and a rotor core 15 disposed so as to cover the field winding 14, magnetic poles being formed in the rotor core 15 by the magnetic flux from the field winding 14. The rotor core 15 is constituted by a first rotor core portion 16 and a second rotor core portion 17 that are alternately intermeshed with each other. The first rotor core portion 16 and the second rotor core portion 17 are made of iron, and have claw-shaped magnetic poles 18 and 19, respectively. Permanent magnets 20 having magnetic fields oriented so as to reduce leakage of the magnetic flux between these claw-shaped magnetic poles 18 and 19 are fixed to adjacent claw-shaped magnetic poles 18 and 19.

The stator 8 includes: a stator core 21; and a stator winding 22 in which conducting wires are wound into this stator core 21 and an alternating current is generated by changes in the magnetic flux from the field winding 14 accompanying rotation of the rotor 7.

Next, operation when a generator-motor having the above construction is used as a generator will be explained.

An electric current is supplied from a battery (not shown) through the brushes 10 and the slip rings 9 to the field winding 14, generating a magnetic flux and magnetizing the claw-shaped magnetic poles 18 of the first rotor core portion 16 into North-seeking (N) poles and the claw-shaped magnetic poles 19 of the second rotor core portion 17 into South-seeking (S) poles. At the same time, since the pulley 4 is driven by an engine and the rotor 7 is rotated by the shaft 6, a rotating magnetic field is applied to the stator winding 22, giving rise to an electromotive force. This alternating electromotive force passes through a rectifier (not shown) and is converted into direct current, its magnitude is adjusted by a regulator (not shown), and the battery is recharged.

Next, operation when a generator-motor having the above construction is used as an electric motor will be explained.

During starting of the engine, an alternating current is supplied to the stator winding 22. A field current is also supplied from a battery (not shown) through the brushes 10 and the slip rings 9 to the field winding 14, generating a magnetic flux and magnetizing the claw-shaped magnetic poles 18 of the first rotor core portion 16 into North-seeking (N) poles and the claw-shaped magnetic poles 19 of the second rotor core portion 17 into South-seeking (S) poles. The stator winding 8 and the rotor 7 act as electromagnets, rotating the rotor 7 inside the stator 8 with the shaft 6. Torque from the shaft 6 is transmitted to an output shaft of the engine by means of the pulley 4, starting the engine.

Now, in a generator-motor, it is necessary to provide a large generated torque to start the engine, in other words, starting torque in the electric motor. If the volume of the permanent magnets 20 used is increased for that purpose, generated torque is improved since the effective magnetic flux contributing to torque generation increases, but when increasing the volume of the permanent magnets 20, it is necessary to keep the volume of the permanent magnets to a minimum for reasons such as the fact that the permanent magnets 20 are expensive, and the fact that there is risk that they may be scattered by centrifugal force during high-speed rotation, etc.

An additional problem is that in a generator-motor an inverter circuit is connected to the stator winding 22 and starting torque is generated by passing an electric current through this inverter circuit, but semiconductor elements are used in the inverter circuit and the semiconductor elements may be destroyed if a voltage greater than or equal to a given voltage tolerance acts on the semiconductor elements, etc.

Consequently, in this generator-motor, the induced voltage at the maximum rotational frequency when the field current is in a "zero" state cannot exceed the semiconductor element breakdown voltage. Moreover, hereinafter, the induced voltage at the maximum rotational frequency with the field current "zero" will be called the "de-energized no-load induced voltage".

If this de-energized no-load induced voltage exceeds the battery voltage, in some cases it may give rise to overcharging, and there are also problems such as the possibility of the semiconductor elements being destroyed by surge voltages generated when trying to control this, etc.

Consequently, in this embodiment, the permanent magnets 20 have a shape that solves these problems and enables a large generated torque to be provided while also reducing the de-energized no-load induced voltage, while keeping the volume of the permanent magnets as small as possible.

In view of this, the present inventors varied the shape of the permanent magnets 20 while keeping the volume of the permanent magnets 20 constant, and found the starting torque and the de-energized no-load induced voltage by three-dimensional electromagnetic field analysis.

Here, the starting torque is torque when a field current is passed through the field winding 14, and the field current passed to the generator-motor is assumed to be the maximum electric current permissible thermally. The armature current passed through the stator winding 22 is also assumed to be the maximum instantaneous current, and the starting torque is set such that a phase angle formed by the field magnetic flux and the armature magnetic flux is the phase angle generating maximum torque. Of course, since there is a limit to the battery voltage, the starting torque must be the maximum torque within this voltage limit.

The de-energized no-load induced voltage is the interterminal voltage when the generator-motor is rotating at a maximum rotational frequency, and the field current is "zero".

A value in which the increase in starting torque with permanent magnets 20 installed compared to the starting torque without permanent magnets 20 (hereinafter "starting torque increase") is divided by the de-energized no-load induced voltage (starting torque increase/de-energized no-load induced voltage) was chosen as an index for considering the above properties. For this reason, it can be said that the greater the value of this index, the more superior the properties since the starting torque is large and the de-energized no-load induced voltage is small.

The present inventors varied the size of the permanent magnets 20 between adjacent claw-shaped magnetic poles 18 and 19 and found the starting torque increase/de-energized no-load induced voltage for each respective automotive alternating-current generator-motor by three-dimensional electromagnetic field analysis.

Figure 3:
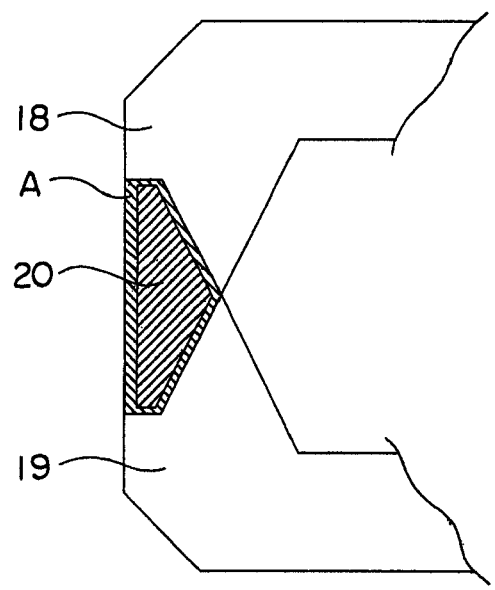
FIG. 3 is a diagram showing a relationship between permanent magnets and claw-shaped magnetic poles according to Embodiment 1.

FIG. 3 shows a case in which a projected shape of the permanent magnets 20 is contained within a plane of projection A formed by adjacent claw-shaped magnetic poles overlapping when the claw-shaped magnetic poles 18 and 19 are viewed in a direction of rotation of the rotor 7, and is generally similar in shape to the shape of the plane of projection A.

Figure 4:
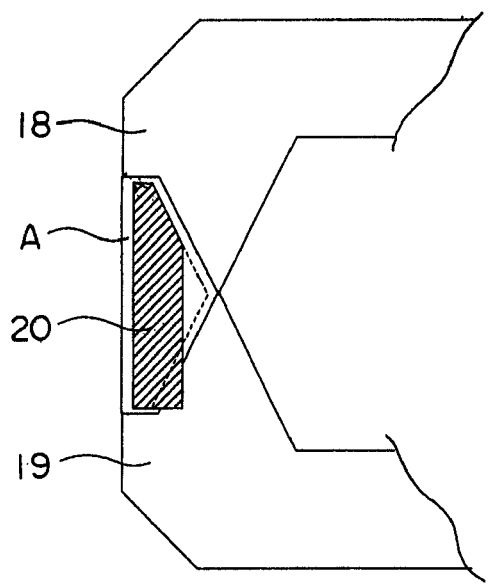
FIG. 4 is a diagram showing another example of a relationship between the permanent magnets and the claw-shaped magnetic poles.
Figure 5:
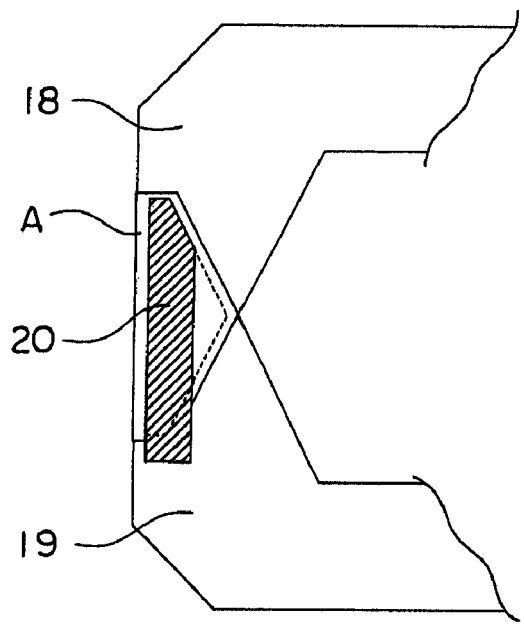
FIG. 5 is a diagram showing another example of a relationship between the permanent magnets and the claw-shaped magnetic poles.

In contrast to this, FIGS. 4 and 5 are diagrams showing permanent magnets 20 mounted between the claw-shaped magnetic poles 18 and 19 so as to protrude from the plane of projection A.

Table 1 shows calculated values for starting torque increase/de-energized no-load induced voltage for permanent magnets 20 having the shapes shown in each of FIGS. 3 to 5. The volume of the permanent magnets 20 and the thickness of the permanent magnets 20 (thickness in the direction of rotation of the rotor 7) was constant in each of FIGS. 3 to 5.

TABLE 1

Relationship between protrusion and properties

|  | Starting torque increase/de-energized no-load induced voltage |
|---|---|
| Shape in FIG. 3 | 0.514 |
| Shape in FIG. 4 | 0.495 |
| Shape in FIG. 5 | 0.493 |

As can be seen in this table, it was found that the starting torque increase/de-energized no-load induced voltage is larger, and the properties are therefore better, when the permanent magnets 20 are mounted within the plane of projection A.

Figure 6:
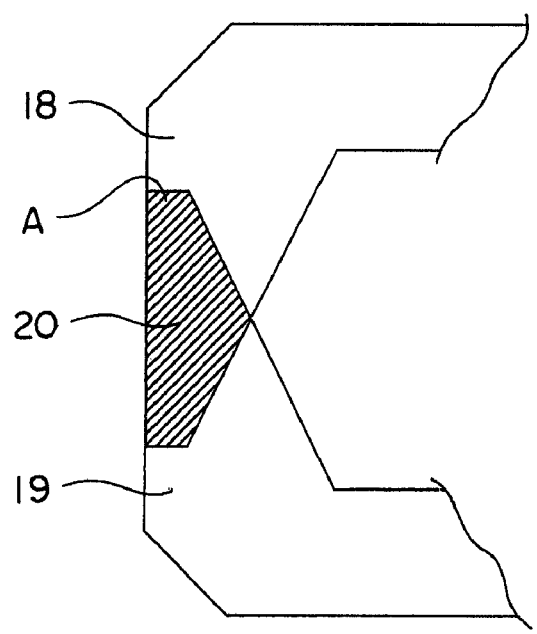
FIG. 6 is a diagram showing another example of a relationship between the permanent magnets and the claw-shaped magnetic poles.

Moreover, it was also found that the properties are almost as good as those of the shape in FIG. 3 if the permanent magnets 20 have an identical shape to the plane of projection A with an identical volume to those of FIGS. 3 to 5, in other words, if the cross-sectional shape when the permanent magnets 20 are sectioned perpendicular to the direction of rotation of the rotor 7 is generally pentagonal, as shown in FIG. 6.

Figure 7:
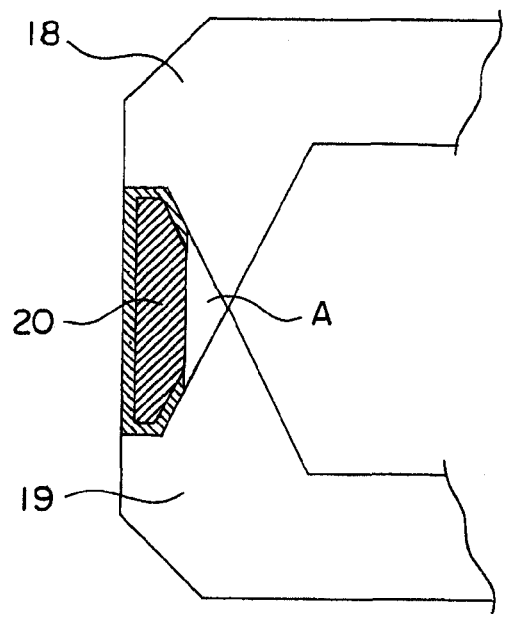
FIG. 7 is a diagram showing another example of a relationship between the permanent magnets and the claw-shaped magnetic poles.

Three-dimensional electromagnetic field analysis was also performed and values of starting torque increase/de-energized no-load induced voltage found by calculation for cases in which the cross-sectional area of the permanent magnets 20 was reduced in a dissimilar shape from the shape of the plane of projection A, as shown in FIG. 7.

Figure 8:
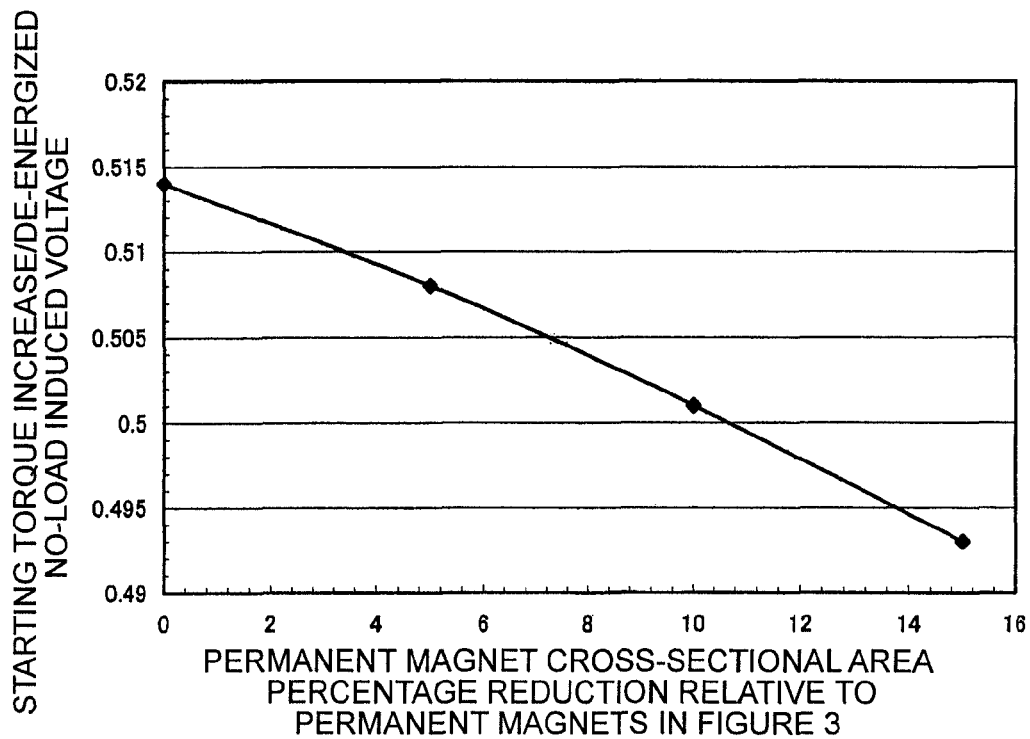
FIG. 8 is a graph showing a relationship between permanent magnet cross-sectional area percentage reduction within a plane of projection and starting torque increase/de-energized no-load induced voltage.

FIG. 8 is a graph showing the calculated results thereof, and from this graph it can be seen that the properties are better if the cross-sectional area of the permanent magnets 20 is increased within the plane of projection A.

When the generator-motor is used as an electric motor, one characteristic is that a large armature current and field current are used since the generator-motor is generally used for a shorter period of time than when it is used as a generator. However, when large electric currents are carried, reverse magnetic fields acting on the permanent magnets 20 are also increased, making irreversible demagnetization more likely to occur. This is a problem specific to generator-motors and not found in generators, but because the permeance of the magnetic circuit is reduced and the magnetic flux density inside the permanent magnets 20 is increased by disposing the permanent magnets 20 within the plane of projection A of the adjacent claw-shaped magnetic poles 18 and 19, one effect is that irreversible demagnetization is less likely to occur.

Figure 9:
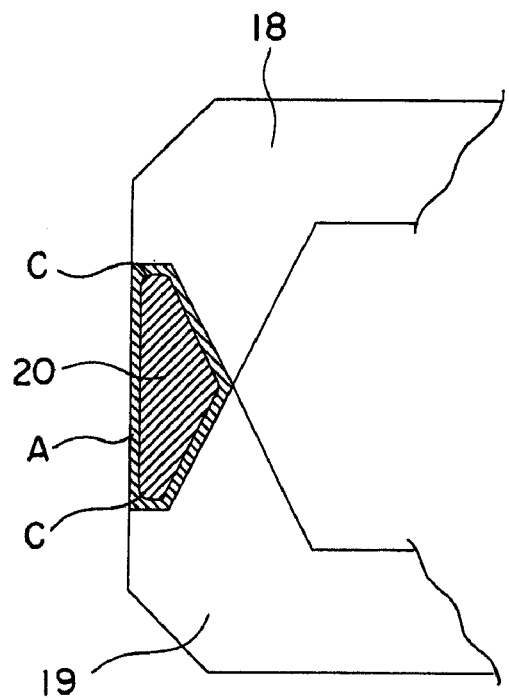
FIG. 9 is a diagram showing another example of a relationship between the permanent magnets and the claw-shaped magnetic poles in Embodiment 1.

Moreover, FIG. 9 shows corner portions C of the permanent magnets 20 shown in FIG. 3 formed with a curved surface shape, a radius of curvature R of the corner portions C being 0.2 mm. In this manner, effects can be achieved such as irreversible demagnetization becoming less likely to occur and the corner portions C becoming less likely to chip, and surface treatment films such as plating, etc., can be prevented from becoming thick at the corner portions C.

Embodiment 2

If the required starting torque is still not achieved by mounting the permanent magnets 20 within the plane of projection A of the adjacent claw-shaped magnetic poles 18 and 19, it may be necessary to increase the volume of the permanent magnets 20 further. Here, one simple way to increase the volume of the permanent magnets 20 is to increase the thickness of the permanent magnets 20 of the rotor 7 (dimensions in the direction of rotation of the rotor 7).

However, since there is only limited space between the adjacent claw-shaped magnetic poles 18 and 19, there is a limit to how much the thickness of the permanent magnets 20 can be increased.

Consequently, the necessity may arise to mount the permanent magnets 20 in portions protruding from within the plane of projection.

FIGS. 10 to 13 show examples in which a portion of the permanent magnets 20 protrudes out of the region of the plane of projection A, but the way in which each protrudes is different.

Figure 10:
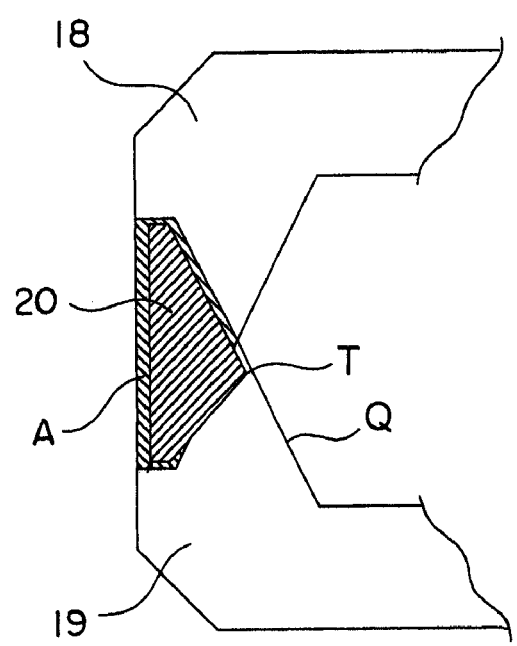
FIG. 10 is a diagram showing a relationship between permanent magnets and claw-shaped magnetic poles according to Embodiment 2 of the present invention.
Figure 11:
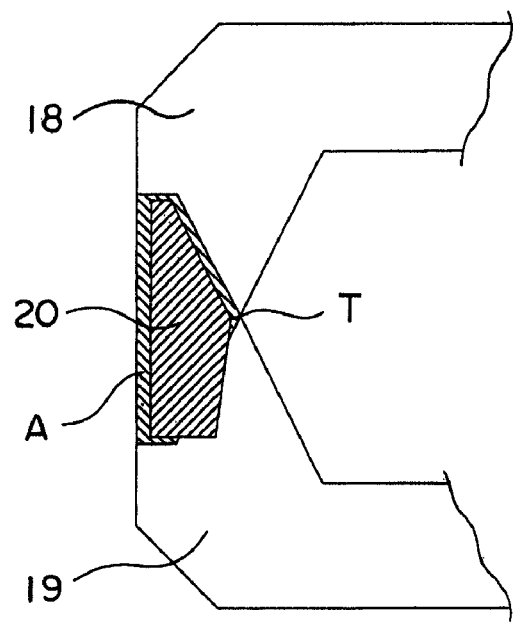
FIG. 11 is a diagram showing another example of a relationship between the permanent magnets and the claw-shaped magnetic poles.
Figure 12:
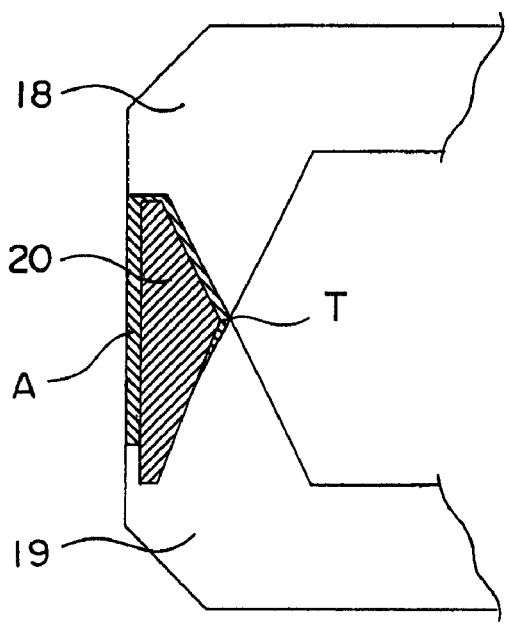
FIG. 12 is a diagram showing another example of a relationship between the permanent magnets and the claw-shaped magnetic poles.

Values of starting torque increase/de-energized no-load induced voltage were found by electromagnetic field analysis for an example in which a radially-innermost point T of the permanent magnets 20 was in the vicinity of a radially-inner peripheral surface Q of the claw-shaped magnetic poles 18 and 19, as shown in FIG. 10, and examples in which the radially-innermost point T of the permanent magnets 20 was within the plane of projection A, as shown in FIGS. 11 and 12.

Figure 14:
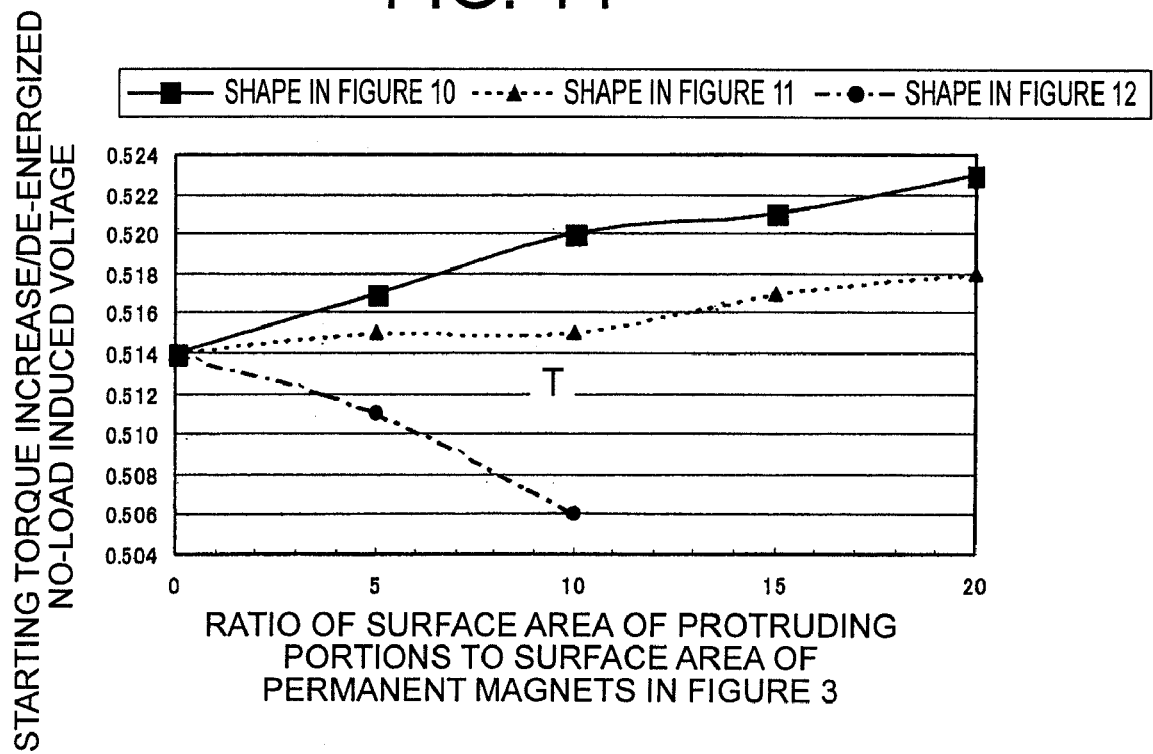
FIG. 14 is a graph showing a relationship between a ratio of surface area of protruding portions to surface area of permanent magnets in FIG. 3 and starting torque increase/de-energized no-load induced voltage in protruding shapes of the permanent magnets.

FIG. 14 is a graph showing the calculated results thereof. Here, the volume of the permanent magnets 20 was made constant for comparison.

As can be seen from this table, the properties of the permanent magnets 20 shown in FIG. 10 are improved compared to the permanent magnets 20 shown in FIGS. 11 and 12.

Figure 13:
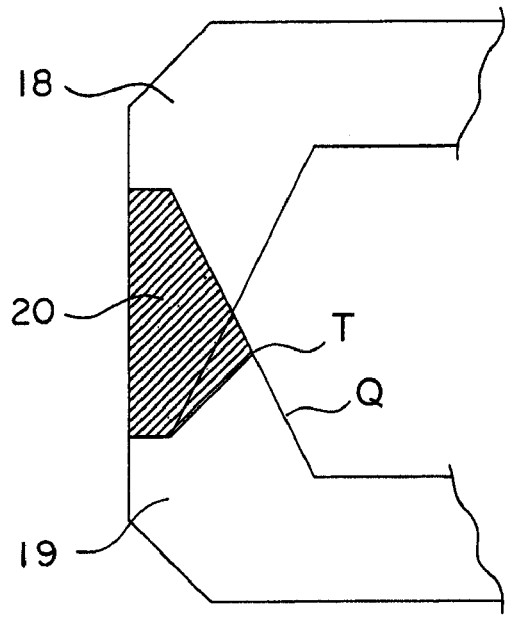
FIG. 13 is a diagram showing another example of a relationship between the permanent magnets and the claw-shaped magnetic poles.

Moreover, satisfactory properties similar to those of the permanent magnets 20 shown in FIG. 10 can also be achieved if the cross-sectional shape of the permanent magnets 20 is a shape identical to that of the plane of projection A everywhere except in a region of protrusion and the radially-innermost point T of the permanent magnets 20 is on the radially-inner peripheral surface Q of the claw-shaped magnetic poles 18 and 19, as shown in FIG. 13.

Embodiment 3

Figure 15:
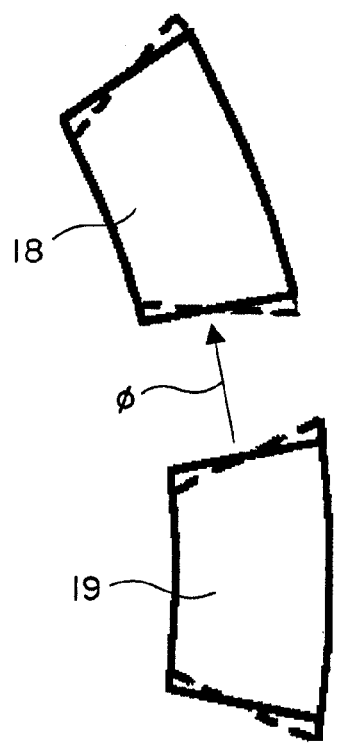
FIG. 15 is a cross section of space between claw-shaped magnetic poles according to Embodiment 3 of the present invention.
Figure 16:
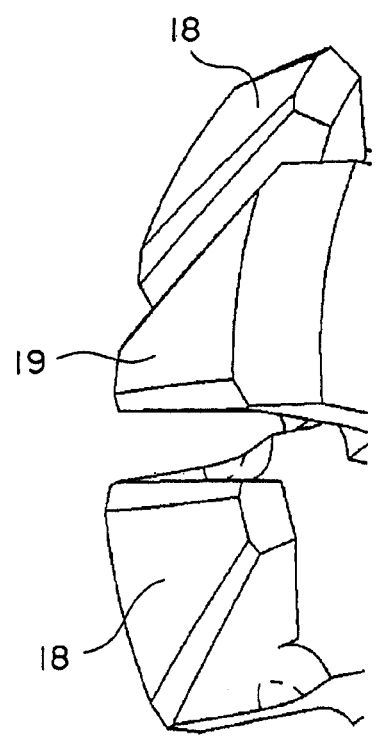
FIG. 16 is a perspective showing the claw-shaped magnetic poles in FIG. 15.
Figure 17:
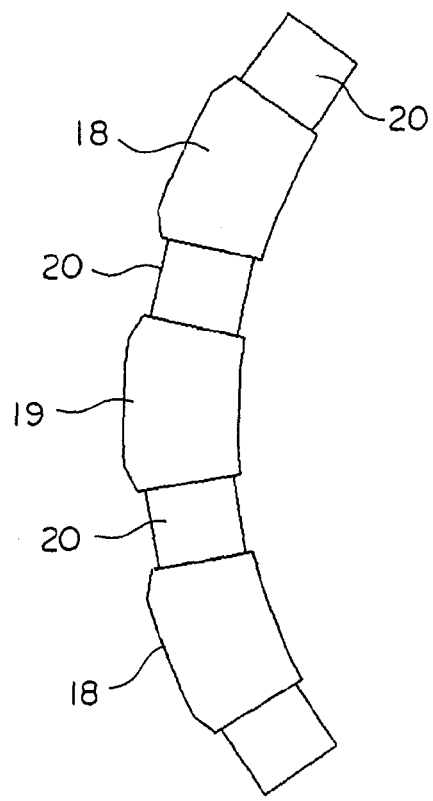
FIG. 17 is a diagram showing permanent magnets disposed between the claw-shaped magnetic poles in FIG. 15.

FIG. 15 is a magnetic pole cross section when claw-shaped magnetic poles 18 and 19 are not parallel and when they are parallel, FIG. 16 is a perspective showing a case when the claw-shaped magnetic poles 18 and 19 are parallel, and FIG. 17 is a partial plan when permanent magnets 20 are mounted between the claw-shaped magnetic poles 18 and 19 shown in FIG. 15.

Figure 18:
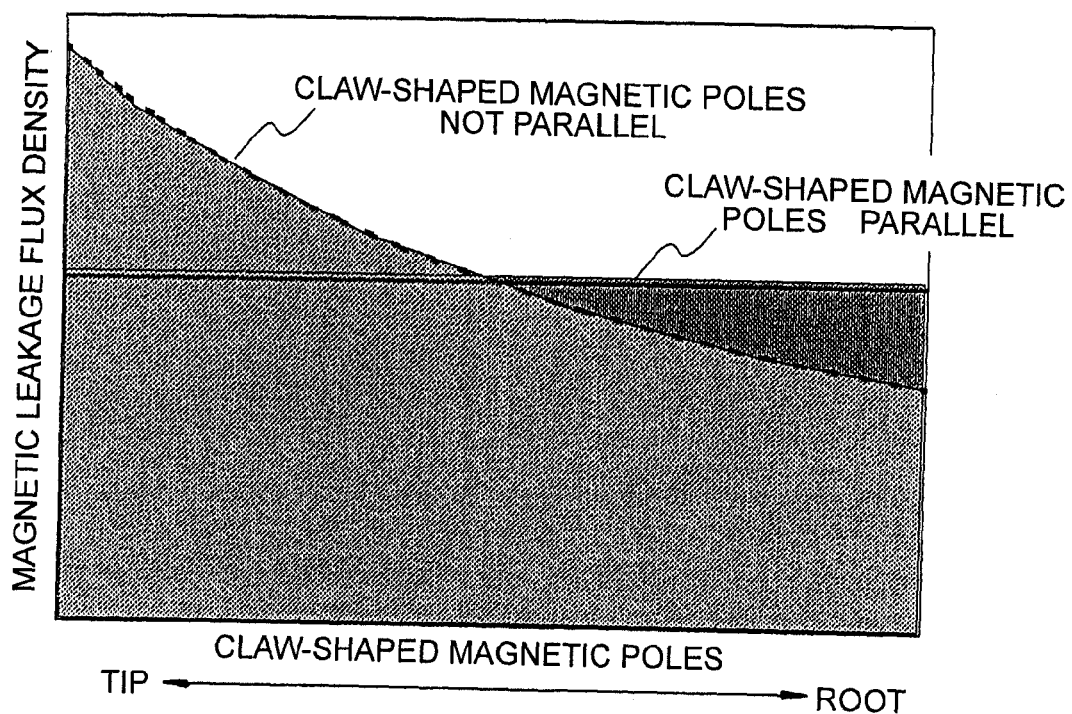
FIG. 18 is a graph showing the magnitude of magnetic leakage flux density when the claw-shaped magnetic poles are not parallel and when they are parallel.

FIG. 18 shows magnetic leakage flux density when the claw-shaped magnetic poles 18 and 19 are not parallel and when they are parallel. When the claw-shaped magnetic poles 18 and 19 are not parallel, the total amount of magnetic flux (surface area in FIG. 18) is increased compared to when they are parallel, since the magnetic leakage flux $\phi$ where the distance between the claw-shaped magnetic poles 18 and 19 is narrow (on the radially-outer side of the rotor 7) increases in inverse proportion to the distance between the claw-shaped magnetic poles 18 and 19, but the amount of magnetic leakage flux can be reduced by making the distance between the claw-shaped magnetic poles 18 and 19 uniform.

Embodiment 4

In Table 2, electromagnetic field analysis was performed and values of starting torque increase/de-energized no-load induced voltage were found when a thickness dimension of the permanent magnets 20 in the direction of rotation of the rotor 7 was varied with a cross-sectional area identical to that of the permanent magnets 20 shown in FIG. 3 explained above.

TABLE 2

Permanent magnet thickness

| | Starting torque increase/de-energized no-load induced voltage |
|---|---|
| Permanent magnet thickness 5.8 mm | 0.514 |
| Permanent magnet thickness 6.2 mm | 0.497 |

As can be seen from this table, there is a tendency for the value of the starting torque increase/de-energized no-load induced voltage to decrease as the thickness dimension of the permanent magnets 20 is increased, and properties are improved if the thickness of the permanent magnets 20 is reduced to an extent that irreversible demagnetization does not occur.

Here, the model is such that the volume of the permanent magnets 20 is increased by an amount proportionate to the increase in the thickness of the permanent magnets 20.

Figure 19:
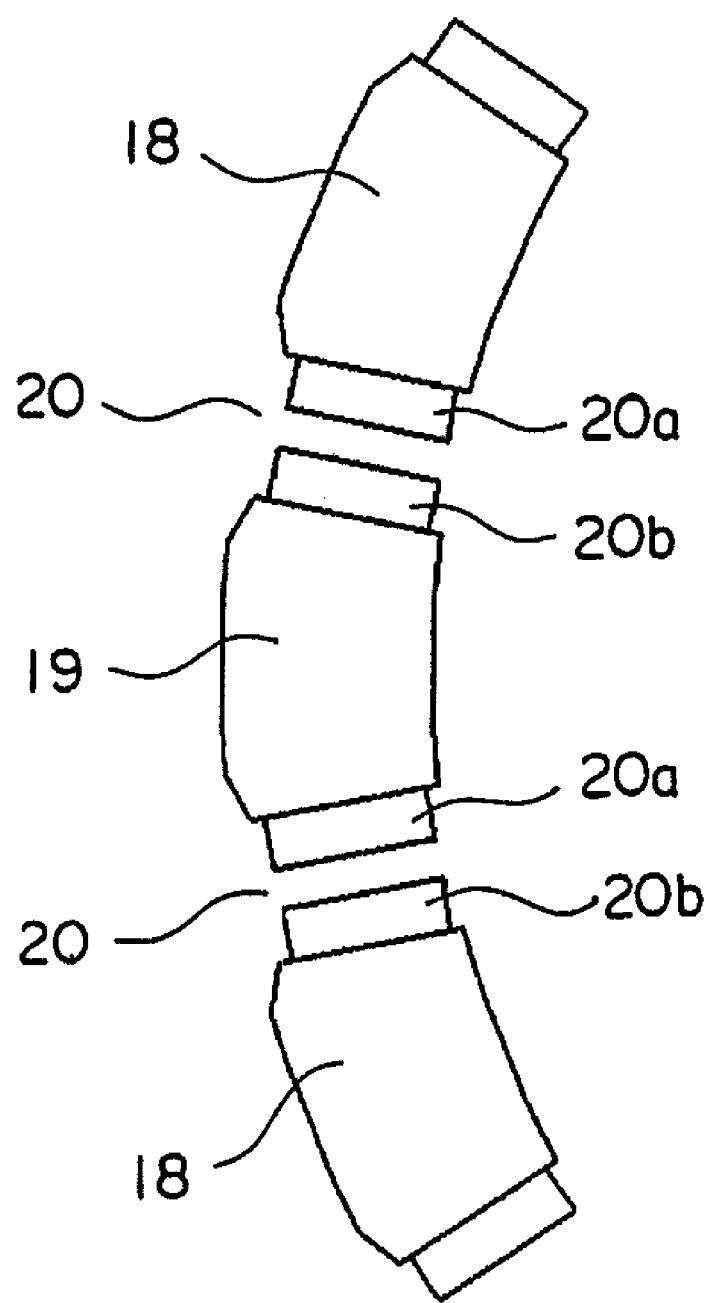
FIG. 19 is a diagram showing an example in which permanent magnets are divided in Embodiment 4 of the present invention.
Figure 20:
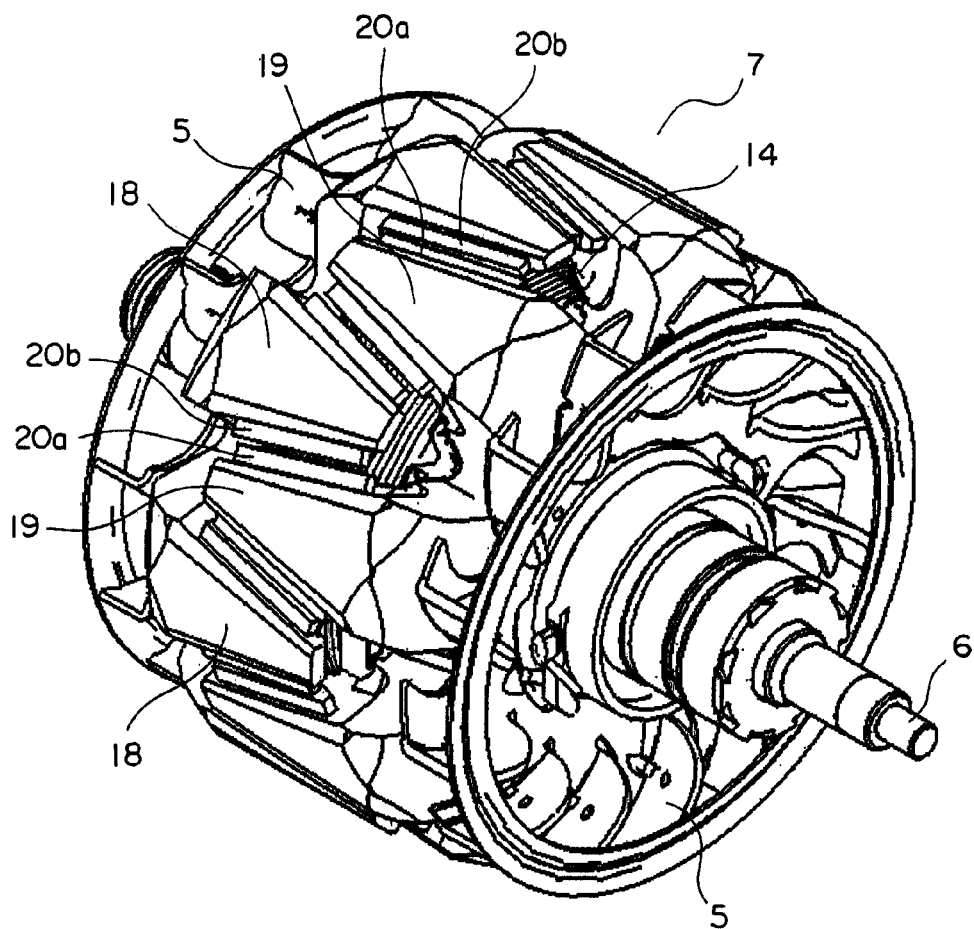
FIG. 20 is a perspective of a rotor according to Embodiment 4 of the present invention.

For that purpose, it is effective for the permanent magnets 20 to be constituted by a pair of magnet portions 20a and 20b cut parallel to facing side surfaces of the adjacent claw-shaped magnetic poles 18 and 19, as shown in FIGS. 19 and 20, and to leave a gap separating the magnet portions 20a and 20b from each other.

By leaving the gap in the permanent magnets 20, permeance is reduced, facilitating the occurrence of irreversible demagnetization in the permanent magnets 20, but by creating the gap, the permanent magnets 20 are cooled because cooling air can pass through, and there are no deleterious effects in cases such as neodymium-iron-boron permanent magnets 20, in which irreversible demagnetization occurs at high temperatures, because the increased likelihood of irreversible demagnetization due to reduced permeance and the reduced likelihood of irreversible demagnetization due to cooling cancel each other out.

Since first side surfaces of the magnet portions 20a and 20b face each other, and second side surfaces always contact the claw-shaped magnetic poles 18 and 19, permeance is not reduced very much in any case, making any loss of magnetic leakage flux reduction small.

Embodiment 5

In order to use the permanent magnets 20 effectively, the present inventors varied the magnetic field strength of the magnet portions 20a and 20b at tip portions of the claw-shaped magnetic poles 18 and 19 and the magnet portions 20a and 20b at root portions and performed three-dimensional electromagnetic field analysis.

The results are shown in Table 3.

TABLE 3

Tip portion permanent magnets and root portion permanent magnets

| | Starting torque increase/de-energized no-load induced voltage |
|---|---|
| Permanent magnets at tip portions of claw-shaped magnetic poles strong | 0.591 |
| Permanent magnets at tip portions and root portions of claw-shaped magnetic poles same | 0.514 |
| Permanent magnets at root portions of claw-shaped magnetic poles strong | 0.466 |

In magnet portions 20a and 20b having identical volume, the value of the starting torque increase/de-energized no-load induced voltage was larger when the magnetic field in the tip portions was made stronger than in the root portions, as shown in Table 3. Here, the permanent magnets 20 are assumed to be within the plane of projection A, and the total magnetic force is identical.

Figure 21:
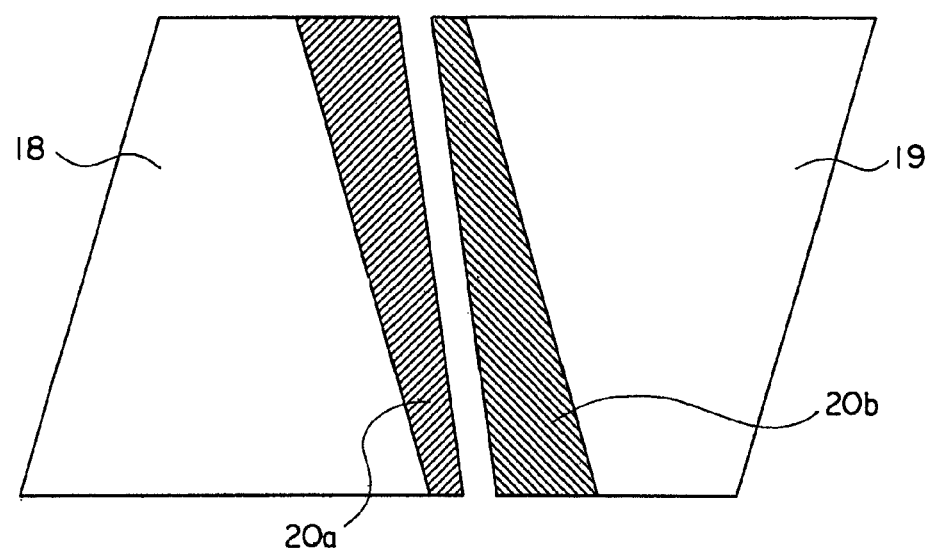
FIG. 21 is a plan of a permanent magnet between adjacent claw-shaped magnetic poles in Embodiment 5 of the present invention.

As an example of a case in which the magnetic field in the tip portions is made stronger than in the root portions, FIG. 21 shows an example in which dimensions of the magnet portions 20a and 20b in the direction of rotation of the rotor 7 gradually increase from the root portions of the claw-shaped magnetic poles 18 and 19 toward the tip portions.

Figure 22:
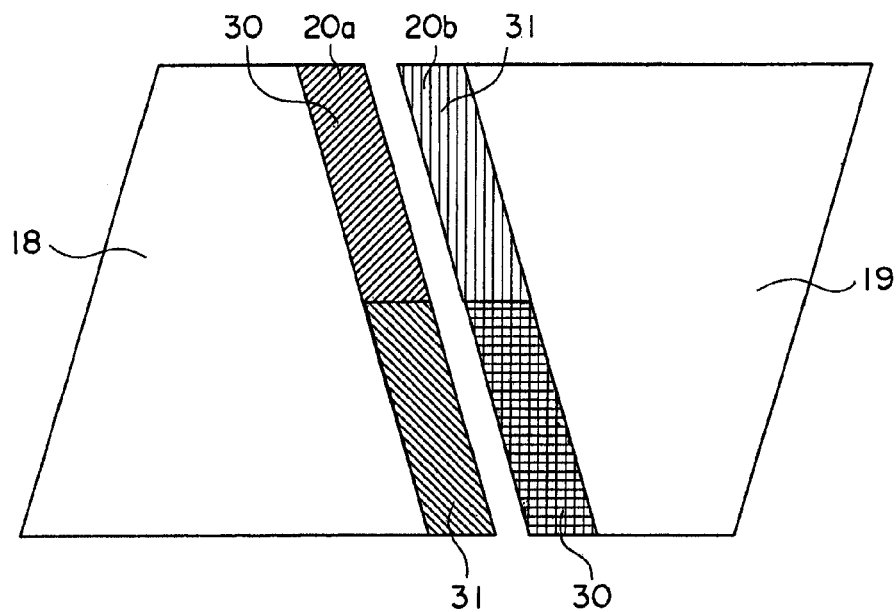
FIG. 22 is a plan showing another example of a permanent magnet between adjacent claw-shaped magnetic poles in Embodiment 5 of the present invention.

FIG. 22 shows an example in which each of the permanent magnets 20 is constituted by a pair of magnet portions 20a and 20b cut parallel to the facing side surfaces of the adjacent claw-shaped magnetic poles 18 and 19, and each of these magnet portions 20a and 20b is constituted by a pair of first and second magnet segments 30 and 31 cut in the direction of rotation of the rotor 7, and of these, the first magnet segments 30, which are near the tip portions of the claw-shaped magnetic poles 18 and 19, have a greater residual magnetic flux density than the second magnet segments 31, which are near the root portions of the claw-shaped magnetic poles 18 and 19.

Figure 23:
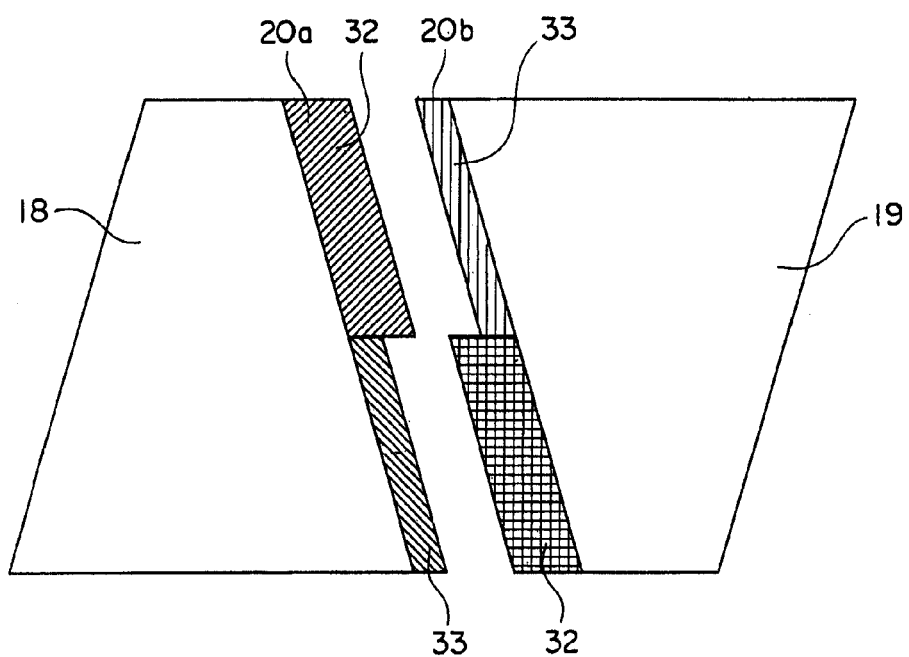
FIG. 23 is a plan showing another example of a permanent magnet between adjacent claw-shaped magnetic poles in Embodiment 5 of the present invention.

FIG. 23 shows an example in which each of the permanent magnets 20 is constituted by a pair of magnet portions 20a and 20b cut parallel to the facing side surfaces of the adjacent claw-shaped magnetic poles 18 and 19, and each of these magnet portions 20a and 20b is constituted by a pair of first and second magnet segments 32 and 33 cut in the direction of rotation of the rotor 7, and the first magnet segments 32 near the tip portions of the claw-shaped magnetic poles 18 and 19 have larger dimensions in a direction of rotation than the second magnet segments 33 near the root portions of the claw-shaped magnetic poles 18 and 19.

Figure 24:
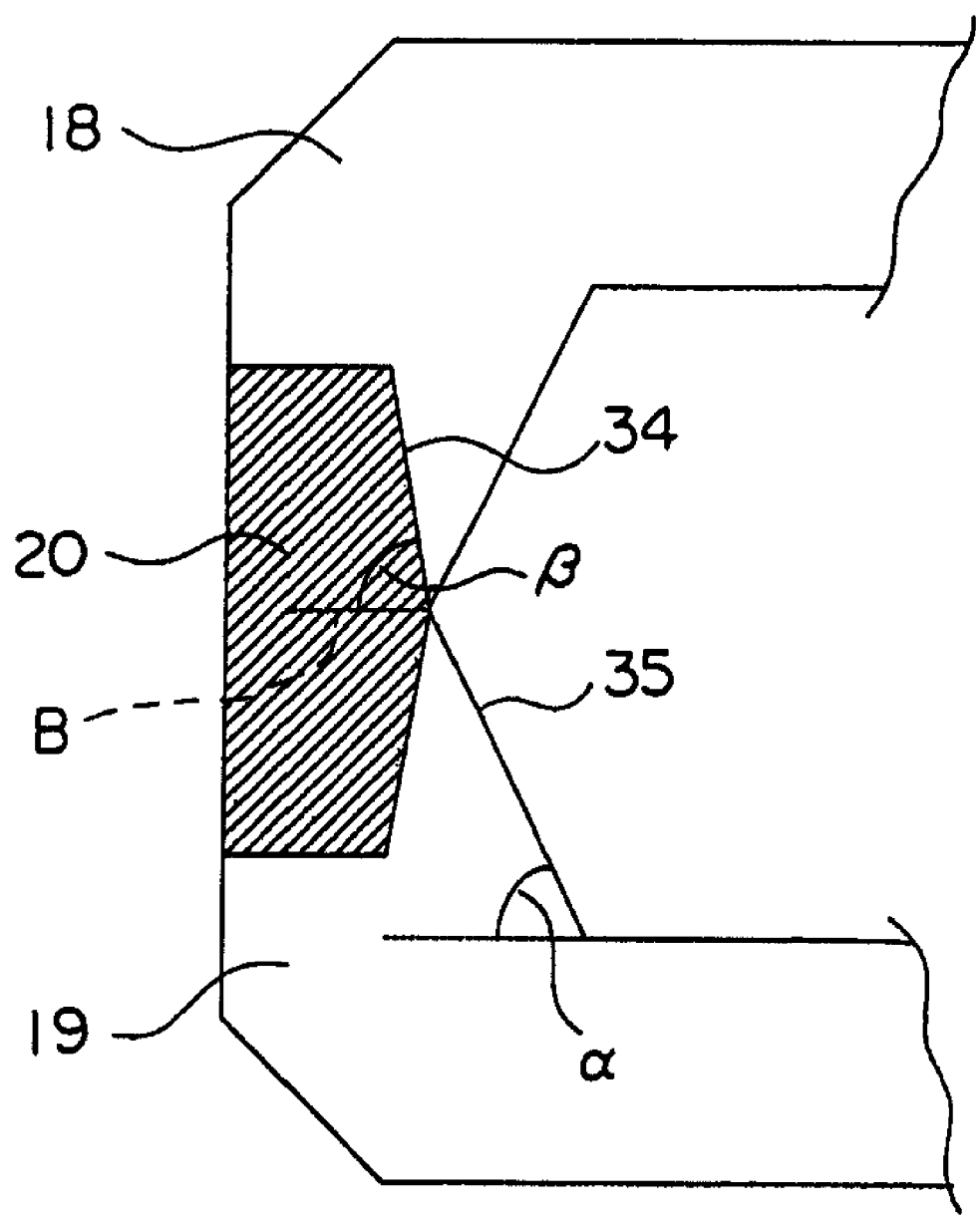
FIG. 24 is a diagram showing a relationship between permanent magnets and claw-shaped magnetic poles in Embodiment 5 of the present invention.

As shown in FIG. 24, similar effects can also be achieved by increasing the projected area at the tip portions of the claw-shaped magnetic poles 18 and 19, enabling magnetic force from the permanent magnets 20 at the tip portions to be increased since the cross-sectional area of the permanent magnets 20 at the tip portions of the claw-shaped magnetic poles 18 and 19 can be increased.

More specifically, an inner peripheral surface of the first rotor core portion 16 and an inner peripheral surface of the second rotor core portion 17 are each constituted by a first peripheral portion 34 near the tip portions of the claw-shaped magnetic poles 18 and 19 and a second peripheral portion 35 near the root portions of the claw-shaped magnetic poles 18 and 19 bent medially, the first peripheral portions 34 having a larger angle of elevation from a radius than the second peripheral portions 35 ($\beta>\alpha$).

A configuration in which the angle of elevation of the inner peripheral surface of the claw-shaped magnetic poles 18 and 19 was identical in the tip portions and the root portions, as shown in FIG. 3, and a configuration in which the angle of elevation was greater in the tip portions, as shown in FIG. 24, were compared under conditions in which the volume of the permanent magnets 20 was identical (adjusted only by the thickness of the permanent magnets 20), the results being shown in Table 4.

TABLE 4

| Angle of elevation | Starting torque increase/de-energized no-load induced voltage |
|---|---|
| Angle of elevation same | 0.514 |
| Angle of elevation in tip portions of claw-shaped magnetic poles greater | 0.527 |

As can be seen from this table, the effects are increased by increasing the angle of elevation in the tip portions.

Moreover, in each of the above embodiments, an automotive generator-motor has been explained as an example of a dynamoelectric machine, but of course the present invention is not limited to automotive generator-motors, and can also be applied to automotive alternators as dynamoelectric machines. Furthermore, the present invention is not limited to automotive vehicles, and for example, can also be applied to outboard motors, or it can also be applied to electric motors.

What is claimed is:

1. An alternating-current dynamoelectric machine comprising:
a stator including:
a stator core in which slots extending in an axial direction are formed on an inner peripheral side; and
a stator winding mounted to said stator core by winding conducting wires into said slots; and
a rotatable rotor including:
a field winding disposed inside said stator;
a rotor core constituted by a first rotor core portion and a second rotor core portion each having claw-shaped magnetic poles disposed so as to cover said field winding and alternately intermesh with each other; and
a plurality of permanent magnets disposed between adjacent claw-shaped magnetic poles and having magnetic fields oriented so as to reduce leakage of magnetic flux between said claw-shaped magnetic poles,
a portion of a projected shape of said permanent magnets protruding outside a plane of projection formed by said adjacent claw-shaped magnetic poles overlapping when said claw-shaped magnetic poles are viewed in a direction of rotation of said rotor,
wherein:
a radially-innermost point of intersection of corner portions of said permanent magnets is outside a region of said plane of projection and is in a vicinity of an inner peripheral surface of said first rotor core portion or said second rotor core portion.

2. An alternating-current dynamoelectric machine comprising:
a stator including:
a stator core in which slots extending in an axial direction are formed on an inner peripheral side; and
a stator winding mounted to said stator core by winding conducting wires into said slots; and
a rotatable rotor including:
a field winding disposed inside said stator;
a rotor core constituted by a first rotor core portion and a second rotor core portion each having claw-shaped magnetic poles disposed so as to cover said field winding and alternately intermesh with each other; and
a plurality of permanent magnets disposed between adjacent claw-shaped magnetic poles and having magnetic fields oriented so as to reduce leakage of magnetic flux between said claw-shaped magnetic poles,
a portion of a projected shape of said permanent magnets protruding outside a plane of projection formed by said adjacent claw-shaped magnetic poles overlapping when said claw-shaped magnetic poles are viewed in a direction of rotation of said rotor,
wherein:
a radially-innermost point of intersection of corner portions of said permanent magnets is inside a region of said plane of projection.

* * * * *